(12) United States Patent
Cloud et al.

(10) Patent No.: US 11,967,459 B2
(45) Date of Patent: Apr. 23, 2024

(54) SUPPLEMENTAL POWER SYSTEMS AND METHODS

(71) Applicant: The Boeing Company, Chicago, IL (US)

(72) Inventors: Mark L. Cloud, Seattle, WA (US); Erik Jon Haugen, Kent, WA (US); Justin Rapozo, Everett, WA (US)

(73) Assignee: The Boeing Company, Chicago, IL (US)

( * ) Notice: Subject to any disclaimer, the term of this patent is extended or adjusted under 35 U.S.C. 154(b) by 375 days.

(21) Appl. No.: 17/372,246

(22) Filed: Jul. 9, 2021

(65) Prior Publication Data

US 2022/0068531 A1 Mar. 3, 2022

Related U.S. Application Data

(60) Provisional application No. 63/070,203, filed on Aug. 25, 2020.

(51) Int. Cl.
| | |
|---|---|
| *H01F 7/06* | (2006.01) |
| *B64D 11/00* | (2006.01) |
| *E05B 47/00* | (2006.01) |
| *E05B 81/80* | (2014.01) |
| *E05B 83/28* | (2014.01) |
| *H01F 7/08* | (2006.01) |
| *H02J 7/34* | (2006.01) |

(52) U.S. Cl.
CPC ........... *H01F 7/064* (2013.01); *B64D 11/003* (2013.01); *E05B 47/0002* (2013.01); *E05B 81/80* (2013.01); *E05B 83/28* (2013.01); *H01F 7/08* (2013.01); *H02J 7/345* (2013.01); *E05B 2047/0067* (2013.01); *E05B 2047/0097* (2013.01)

(58) Field of Classification Search
CPC ......... H01F 7/064; H01F 7/08; B64D 11/003; E05B 47/0002; E05B 81/80; E05B 83/28; E05B 2047/0067; E05B 2047/0097; H02J 7/345
USPC .......................................................... 307/64
See application file for complete search history.

(56) References Cited

U.S. PATENT DOCUMENTS

| 5,456,529 A | 10/1995 | Cheung | |
|---|---|---|---|
| 2015/0330116 A1* | 11/2015 | Dente | ..................... B60L 58/15 307/10.1 |
| 2022/0076510 A1* | 3/2022 | Morris | ............... G07C 9/00912 |

\* cited by examiner

*Primary Examiner* — Michael R. Fin
(74) *Attorney, Agent, or Firm* — Haynes and Boone, LLP

(57) ABSTRACT

A system includes a latch circuit configured to monitor a switch and to operate an electronic latch based on a position of the switch. The system also includes a power supply circuit configured to provide a first voltage level to the latch circuit during normal operations and a second voltage level to the latch circuit during power loss. The power supply circuit includes a primary power circuit configured to provide the first voltage level to the latch circuit and a plurality of supercapacitors configured to be charged by the primary power circuit and provide the second voltage level to the latch circuit.

20 Claims, 6 Drawing Sheets

SUPPLEMENTAL POWER SYSTEMS AND METHODS

CROSS-REFERENCE TO RELATED APPLICATION

This application is a non-provisional application of U.S. Patent Application No. 63/070,203, filed 25 Aug. 2020, and the entire disclosure of which is incorporated herein by reference.

TECHNICAL FIELD

The present application generally relates to supplemental power systems and methods. More particularly, it relates to electronic devices in a vehicle that are powered by the supplemental power systems.

BACKGROUND

Certain components and equipment on a vehicle use electrical power generated by the vehicle to operate. For example, in certain vehicles, an aircraft engine or an auxiliary power unit (APUs) may be used to produce electricity that is converted to useable voltages to operate such equipment. Some equipment may be battery powered, but this approach has certain drawbacks and alternative techniques for energizing such equipment are desired.

SUMMARY

According to an example, a system is described, including: a latch circuit configured to monitor a switch and to operate an electronic latch based on a position of the switch; and a power supply circuit configured to provide a first voltage level to the latch circuit during normal operations and a second voltage level to the latch circuit during power loss, wherein the power supply circuit includes: a primary power circuit configured to provide the first voltage level to the latch circuit; and a plurality of supercapacitors configured to be charged by the primary power circuit and provide the second voltage level to the latch circuit.

According to another example, a vehicle is described, including: a stowage bin; and a bin door including the electronic latch and coupled to the stowage bin, wherein the electronic latch is configured to open the bin door in response to the solenoid unlatching the electronic latch.

According to another example, a method of assembling a system is described. The method includes: coupling an output terminal of the power supply circuit to a first end of a power supply line; coupling an input terminal of the latch circuit to a second end of the power supply line; and coupling an output terminal of the latch circuit to the electronic latch.

According to another example, a method for operating a stowage bin door of a vehicle is described. The method includes: monitoring the position of the switch; and applying the first voltage level or the second voltage level to the electronic latch in response to determining that the position of the switch corresponds to an unlatch command.

According to another example, a method is described, including: providing, by a primary power circuit, a first voltage to a latch circuit; applying a first voltage level to an electronic latch coupled with the latch circuit in response to receiving an unlatch command; charging, by the primary power circuit, a bank of supercapacitors; and monitoring the first voltage level from the primary power circuit and in response to determining a loss of the first voltage level, applying a second voltage level from the bank of supercapacitors to the electronic latch.

A more complete understanding of the examples will be afforded to those skilled in the art, as well as a realization of additional advantages thereof, by a consideration of the following detailed description of one or more embodiments. Reference will be made to the appended sheets of drawings that will first be described briefly.

Figure 1:
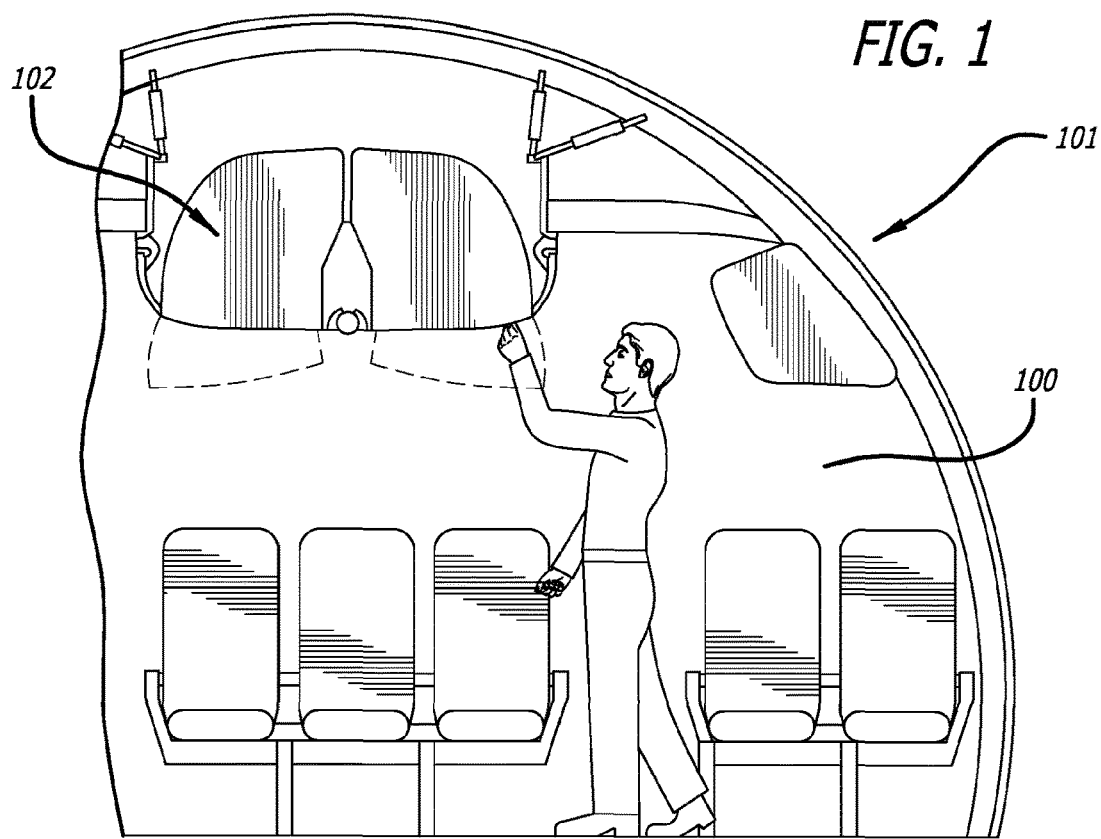
FIGS. 1-2 illustrate examples of an overhead stowage bin in an aircraft.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, various examples will be described in more detail with reference to the accompanying drawings. The examples, however, may be embodied in various different forms, and should not be construed as being limited to only the illustrated examples herein. Rather, they are provided as examples so that this disclosure will be thorough and complete and will fully convey the aspects and features of the examples to those skilled in the art. Accordingly, processes, elements, and techniques that are not necessary to those having ordinary skill in the art for a complete understanding of the aspects and features of the examples may not be described.

The various examples that are provided throughout the present disclosure describe techniques for energizing and operating an electronic device on a vehicle. According to one example, such electronic device may be an electronic latch incorporated as part of a passenger stowage bin or stowage bin door in an aircraft.

Some stowage bin doors in an aircraft have mechanical latches that keep the doors closed or that can be opened manually by a person by operating the mechanical latch. However, some stowage bin doors have electronic latches that can be operated by a person locally, for example, by pushing or touching a button that electronically operates the latch, or remotely by a person or a computer system to automatically and/or electronically operate the electronic latch to unlock and/or open the stowage bin doors. The electronic latch may unlatch the door to cause the door to open when or the electronic latch may simply unlock the latch so that a person can manually open the door, for example by physically moving the door or physically operating another mechanical latch that opens the unlocked door. In some instances, the electronic latch may be programmed by a computer system to automatically open under certain emergency conditions. In either case, the electronic latch is electronically operable to be opened, closed, latched, unlatched, locked, or unlocked, by an actuator such as a solenoid or a pneumatic actuator that is coupled with or is a part of the electronic latch. Thus, by energizing or deenergizing the solenoid, or applying pneumatic pressure to the pneumatic actuator, the electronic latch may be operated.

Figure 2:
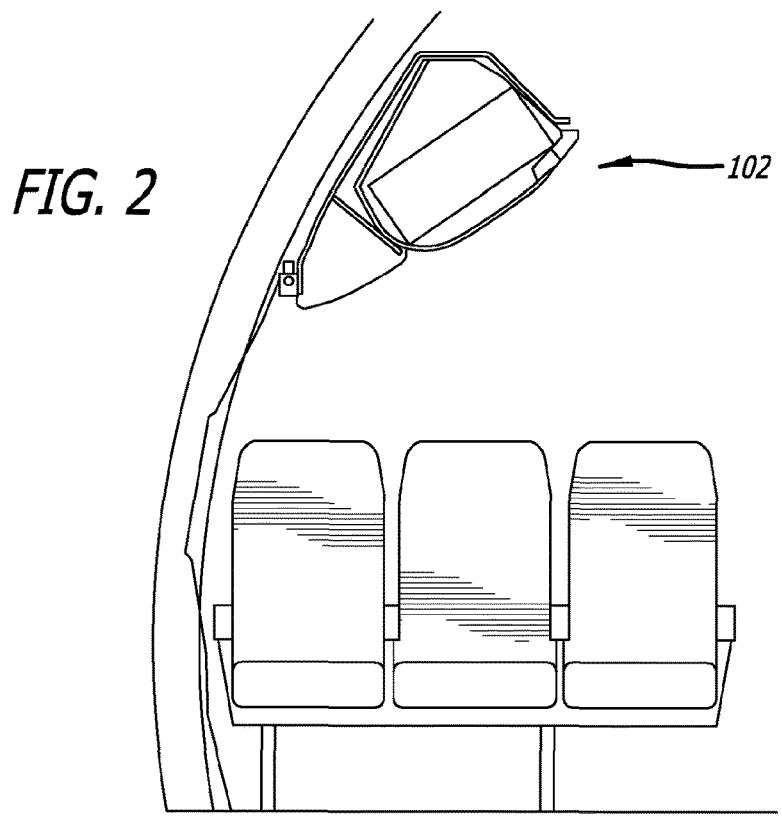

FIGS. 1-2 are cross-sectional views of a passenger cabin 100 of a vehicle 101, illustrating example locations of overhead stowage bins 102. In the example of FIGS. 1-2, the vehicle 101 is an aircraft. However, other vehicles are possible as well. The stowage bins 102 may be located generally above the passenger seats so that the passengers can easily reach and access them. Accordingly, a passenger may stand up and operate an electronic latch to manually open the stowage bins 102 or the electronic latch may be operated remotely.

Figure 3:
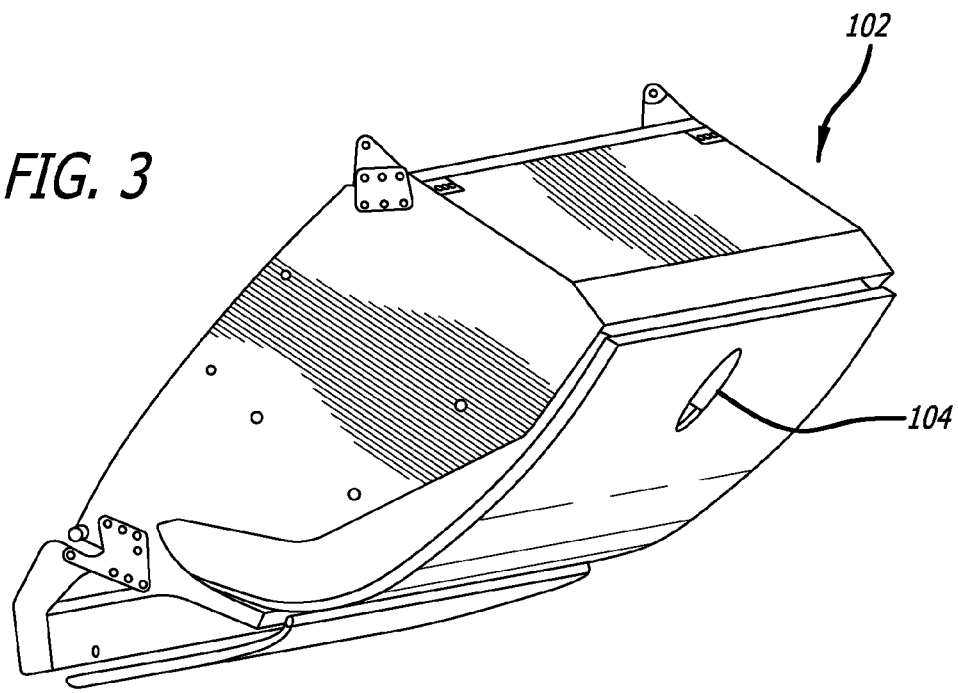
FIGS. 3-4 illustrate an example of an overhead stowage bin in a closed and an opened configuration.
Figure 4:
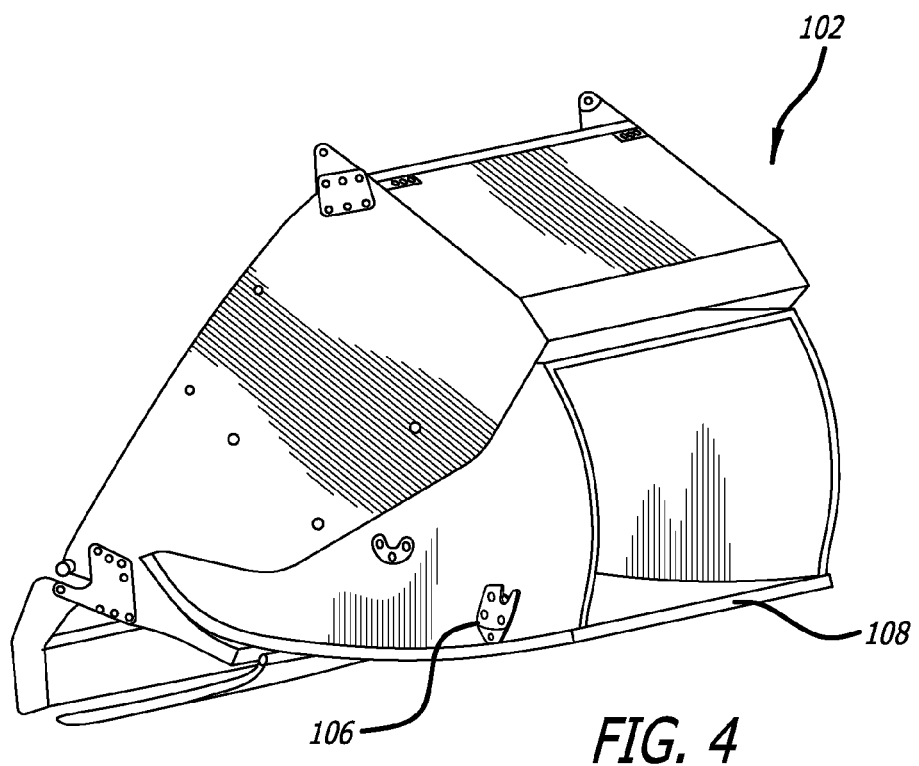

FIGS. 3-4 are perspective views of an example overhead stowage bin 102 with a stowage bin door 108 in a closed position (FIG. 3) and an opened position (FIG. 4). In this example stowage bin 102, a lever 104 is configured to be operated by a person to cause the electronic latch 106 to unlatch and open the stowage bin 102. Although the example stowage bin 102 is illustrated with a lever 104, the lever may instead be, for example, a button, a switch, or a touch panel, configured to be operated by a person to operate the electronic latch 106. In some instances, it may be desirable for the stowage bins 102 to be operated remotely, for example, by the flight crew. For example, the flight crew may lock all the stowage bins 102 during takeoff and landing. In other instances, the flight crew may want to remotely open all the stowage bins before the passengers begin boarding. Yet in other instances, it may be desirable to remotely open certain stowage bins that contain emergency equipment such as oxygen tanks, automated external defibrillators, and/or other medical and emergency equipment. Furthermore, it is desirable to ensure such stowage bins containing the emergency equipment can be opened even when there is a loss of power. While conventional techniques may rely on batteries to provide backup power, batteries are relatively heavy, thus they can negatively affect flight performance of an aircraft. Additionally, after numerous charging and discharging cycles, the lifespan of the batteries can degrade, after which the batteries have to be replaced, thus increasing maintenance costs. The techniques described in the present disclosure utilizes supercapacitors to provide a backup or a supplemental means of power for electronic devices on a vehicle. Supercapacitors are substantially cheaper than batteries and charging such capacitors utilizes little current when compared to rechargeable batteries. Although the present disclosure will be described with reference to stowage bins using electronic latches in an aircraft by way of a specific example, the techniques may be applicable to any electronic devices in a vehicular environment.

Figure 5:
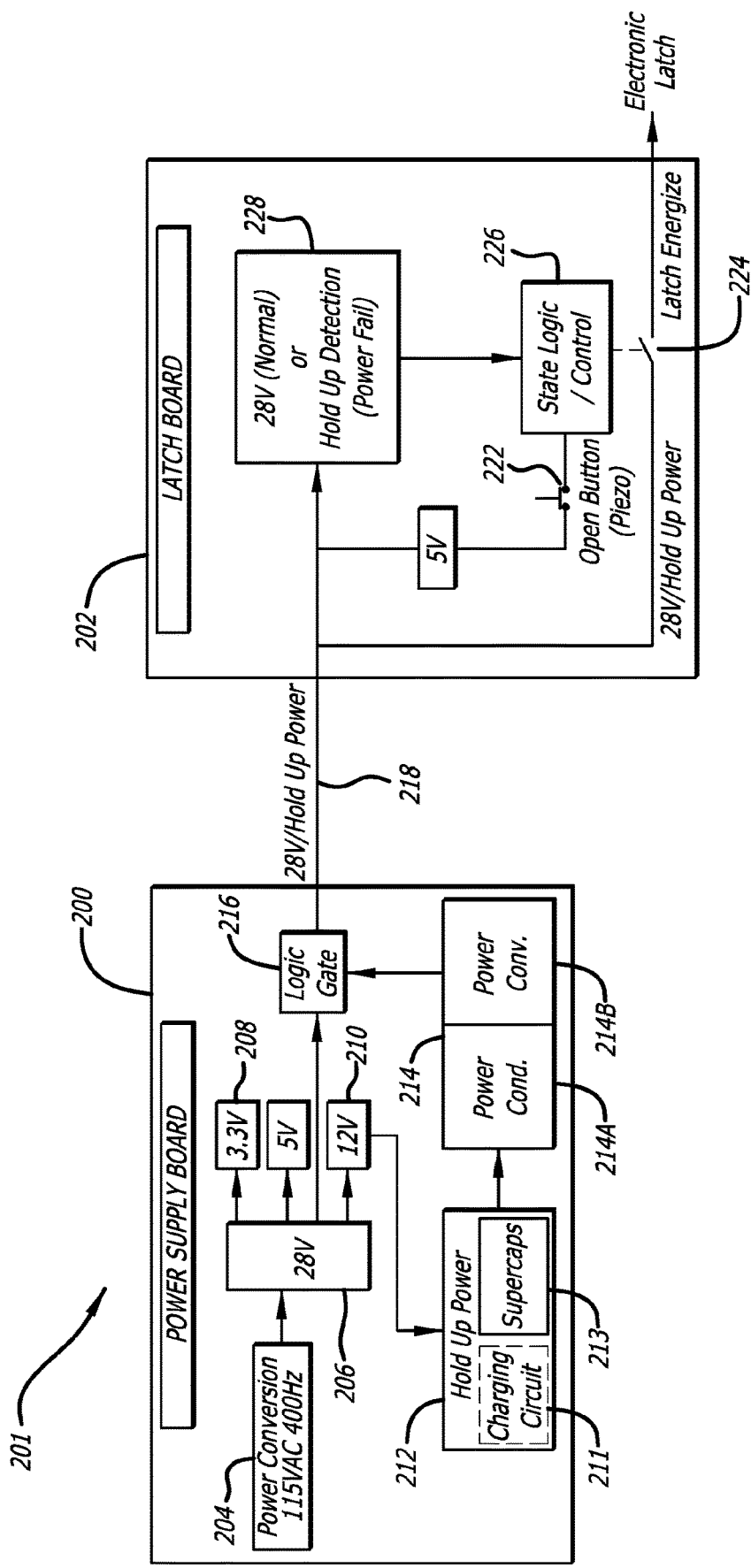
FIG. 5 is a block diagram of a power supply circuit and a latch circuit, according to an example of the present disclosure.

FIG. 5 is a block diagram of a system 201 including a power supply circuit and a latch circuit, according to an example of the present disclosure. The power supply circuit 200 is configured to receive its power from an external power source, such as an electrical generator on an aircraft, that provides an AC voltage, e.g., 115 VAC 400 Hz. The externally generated power may be converted by a power conversion circuit 204 on the power supply circuit 200 to convert the AC voltage to a DC voltage that is usable by the different electrical systems and devices onboard the aircraft. In some examples, the power conversion circuit 204 may be a separate circuit that is located external to the power supply circuit 200, and the power supply circuit 200 may be configured to receive DC voltages that have already been converted by the external converter.

According to the illustrated example, the power conversion circuit 204 converts 115 VAC to 28V and is provided to a primary power circuit 206. From the primary power circuit 206, the 28V is further divided into various usable operating voltages such as, for example, 3.3V, 5V, and 12V, and are provided to corresponding circuits 208, 210. From there, the different voltages may be coupled via power supply lines to various circuits throughout the aircraft that may operate from these voltages. For example, the 5V may be supplied to USB outlets in the passenger cabin. More particularly, the primary power circuit 206 may be electrically coupled to the latch circuit 202 via a power supply line 218, and the latch circuit 202 may be further coupled to a solenoid to operate an electronic latch, such as electronic latch 106 of FIG. 4.

According one example, the primary power circuit 206 of the power supply circuit 200 is coupled to a power failure detection circuit 228 of the latch circuit 202 and is also provided to the solenoid of the electronic latch via a switch 224. Accordingly, when an operator pushes a button on the stowage bin door or pulls on the lever of the stowage bin, that operation closes or depresses a switch 222, which then applies 5V to a state logic control 226, which then closes the switch 224. By closing the switch 224, the 28V from the primary power circuit 206 is applied to the solenoid, which unlatches the electronic latch. Similarly, when the switch 224 is opened, the 28V is removed from the solenoid and the electronic latch is latched.

According to another example of the present disclosure, a secondary means of providing power to the latch circuit 202 and the electronic latch, is provided. The power supply circuit 200 further includes a hold up power circuit 212 that includes a bank of supercapacitors 213 configured to provide an alternate means of power to the latch circuit 202, for example, in case power from the primary power circuit 206 is lost. In such case, energy stored in the bank of supercapacitors 213 can be discharged to provide power to the latch circuit 202.

More particularly, the supercapacitors 213 are configured to be charged by the primary power circuit 206 and the output of the supercapacitors 213 is coupled to a power converter and a power conditioning circuit 214 where the power converter 214B is coupled to an output of the power conditioner 214A. According to one example, the primary power circuit 206 may provide 28V to a 12V circuit 210, and the 12V circuit 210 may be coupled to supercapacitors 213 to be charged. The power converter 214B converts the output voltage from the supercapacitors 213 to 24V and the power conditioner 214A filters the output voltage from the supercapacitors 213. Thus, according to the example, the filtered and conditioned 24V output voltage is coupled to an input of a logic gate 216 (e.g., a logic circuit) where it remains idle until the 28V from the primary power circuit 206 is lost. For example, the logic gate 216 may be a logic OR gate (e.g., a diode OR gate) wherein the 28V from the primary power circuit 206 is coupled to the first input of the OR gate and the 24V from the supercapacitors 213 is coupled to the second input of the OR gate. Thus, the OR gate can provide either the 28V or the 24V to the latch circuit 202, whichever is present. In one example circuit, the OR gate can be configured to prioritize the 28V such that when the 28V is present at the first input of the OR gate, then the 28V is provided to the latch circuit 202. If both the 28V and the 24V are present at the inputs of the OR gate, then the 28V is provided to the latch circuit 202. On the other hand, if the 28V is not present at the first input but the 24V is present at the second input, then then 24V is provided to the latch circuit 202. Thus, the OR gate can be configured to monitor the presence of the 28V from the primary power circuit 206 and when the 28V is lost, then the 24V may be supplied to the latch circuit 202. Moreover, the electronic latch is configured to operate in the same manner whether 28V is applied or 24V is applied to the solenoid. The difference in the voltages is so that the power failure detection circuit 228 can determine the source of the voltage.

According to another example, the hold up power circuit 212 includes a charging circuit 211 that is configured to charge the bank of supercapacitors 213 from the primary power circuit 206 (via the 12V circuit 210). Thus, during normal operations, the power from the primary power circuit 206 may be used to charge the supercapacitors 213 and to keep them fully charged so that in case the power from the primary power circuit 206 is lost, the supercapacitors 213 may be discharged to provide ride-through power to the latch circuit 202. By way of example, and not of limitation, the supercapacitors 213 may be a plurality of electric double-layer capacitors (EDLCs) that are arranged in parallel and in series to achieve the desired output voltage level and desired balance. Furthermore the EDLCs may be configured in a manner that achieves desired charging and discharging times, which determine the length of time it takes to charge the bank of supercapacitors, the length of time in which the bank of supercapacitors 213 can maintain their charge when the output is idle and the supercapacitors 213 are not being charged, and the length of time in which the bank of supercapacitors 213 can last (e.g., continue to provide power) when connected to a load (e.g., when being used to power the latch circuit 202 during a loss of power situation). Thus, the EDLCs may be configured to hold its charge for days, weeks, or months, under no-load and for days or weeks under load, based on their configuration.

According to another example, the latch circuit 202 may be configured to monitor a switch 222 (e.g., a piezo button switch that is operable by an operator/user), and operate the electronic latch based on the position of the switch 222. The power supply circuit 200 provides a first voltage level (e.g., 28V) to the latch circuit 202 during normal operations of the aircraft but if the power to the power supply circuit 200 is lost, for example, due to malfunction of the electric generator, then a second, different voltage (e.g., 24V) is provided to the latch circuit 202. As such, during normal operations, the first voltage level to the latch circuit 202 is provided from the primary power circuit 206 and during power loss conditions, the second voltage level to the latch circuit 202 is provided from the bank of supercapacitors.

In certain examples, the power failure detection circuit 228 is configured to monitor the input from the power supply line 218 to the latch circuit 202, which receives either the first voltage or the second voltage. As long as the power failure detection circuit 228 senses 28V, then it determines that the primary power circuit 206 is providing the first voltage level and that the circuit is operating under normal operations. On the other hand, if the power failure detection circuit 228 senses 24V, then it determines that the power from the primary power circuit 206 is lost and that the circuit is operating under backup power conditions. In some examples, the power failure detection circuit 228 may be coupled to an indicator, for example, that is visible by the flight crew on a display panel and/or an indicator lamp (e.g., LED) in the vicinity of the stowage bin door. Accordingly, the latch circuit 202 is configured to operate based on logic and therefore does not rely on a computer or processor to operate and/or monitor for power failures. Furthermore, the hold up power circuit 212 provides a ride-through power that is transparent to the user. Therefore, even if there is a power loss, a user would not notice that there was a power loss and the electronic latch is now being powered by the supercapacitors 213 without looking at the indication provided by the power failure detection circuit 228.

Figure 6:
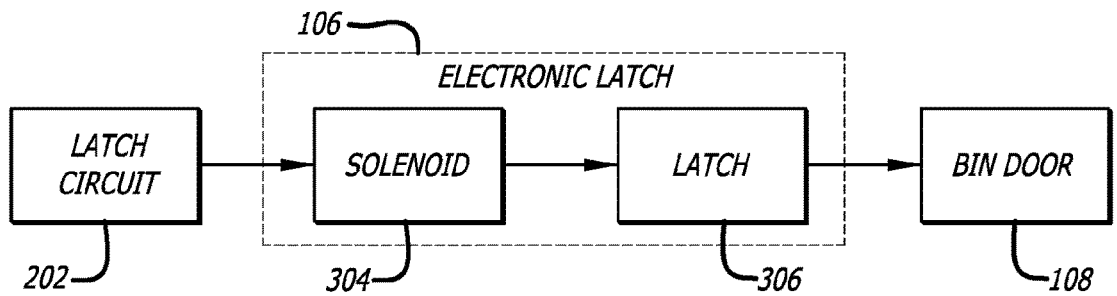
FIG. 6 is a block diagram of a latch circuit coupled to a stowage bin door, according to an example of the present disclosure.

FIG. 6 is a block diagram of a latch circuit coupled to the stowage bin door, according to an example of the present disclosure. As described above, the power supply circuit 200 provides a voltage level (e.g., 28V or 24V) to the latch circuit 202, and the latch circuit 202 then uses that voltage to operate the electronic latch 106. According to one example, the electronic latch 106 comprises an actuator such as a solenoid 304 and a mechanical latch 306. Thus, the output of the latch circuit 202 is coupled to the solenoid 304 of the electronic latch 106. When the solenoid 304 is energized by the voltage from the latch circuit 202, the solenoid 304 causes the mechanical latch 306 to unlatch, which then causes the stowage bin door 108 to open. When the latch circuit 302 does not provide a voltage to the solenoid 304, for example, because the user is not operating the stowage bin door 108, then the solenoid 304 is deenergized and the mechanical latch 306 is latched or remains latched.

Figure 7:
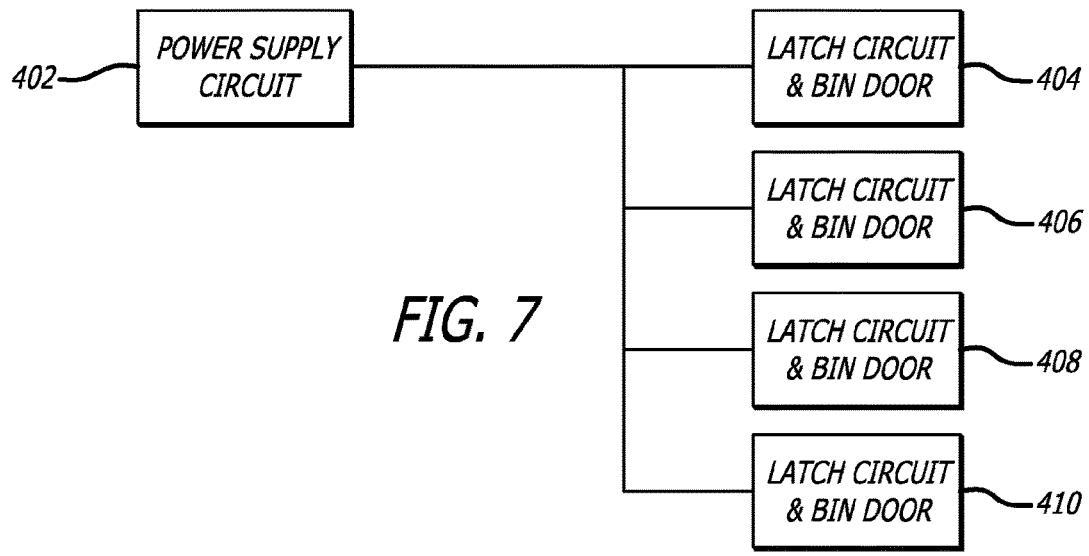
FIG. 7 is a block diagram of a power supply circuit coupled to a plurality of latch circuit and stowage bin doors, according to an example of the present disclosure.

FIG. 7 is a block diagram of a power supply circuit coupled to a plurality of latch circuits and stowage bin doors, according to an example of the present disclosure. Thus, according to one example, a single power supply circuit 402 can be used to provide power (e.g., from the primary power circuit or the supercapacitors) to a plurality of latch circuits and stowage bin doors 404-410. That is, each stowage bin door may have a distinct corresponding latch circuit to operate the electronic latch, and a plurality of the stowage bin doors and latch circuits may be grouped together to receive power from the same power supply circuit 402. For example, all of the stowage bin doors located on the left side of the passenger cabin may be coupled to the same single power supply circuit, or all of the stowage bin doors in the first class cabin may be coupled to the same single power supply circuit. By grouping and coupling multiple latch circuits and stowage bin doors to a single power supply circuit, cost savings can be achieved. Single power supply circuit 402 is similar to the power supply circuit 200 described with respect to FIG. 5 and thus is not described in as great of detail. It should be explicitly noted, however, that in examples, any possibilities and permutations described above with respect to the power supply circuit 200 may equally apply to power supply circuit 402. Further, the plurality of latch circuits and stowage bin doors 404-410 are similar to the latch circuit and stowage bin door described with reference to FIG. 1-5 and thus are not described in as great of detail. It should be explicitly noted, however, that in examples, any possibilities and permutations described above with respect to the latch circuit and stowage bin door described with reference to FIG. 1-5 may equally apply to the plurality of latch circuits and stowage bin doors 404-410.

Figure 8:
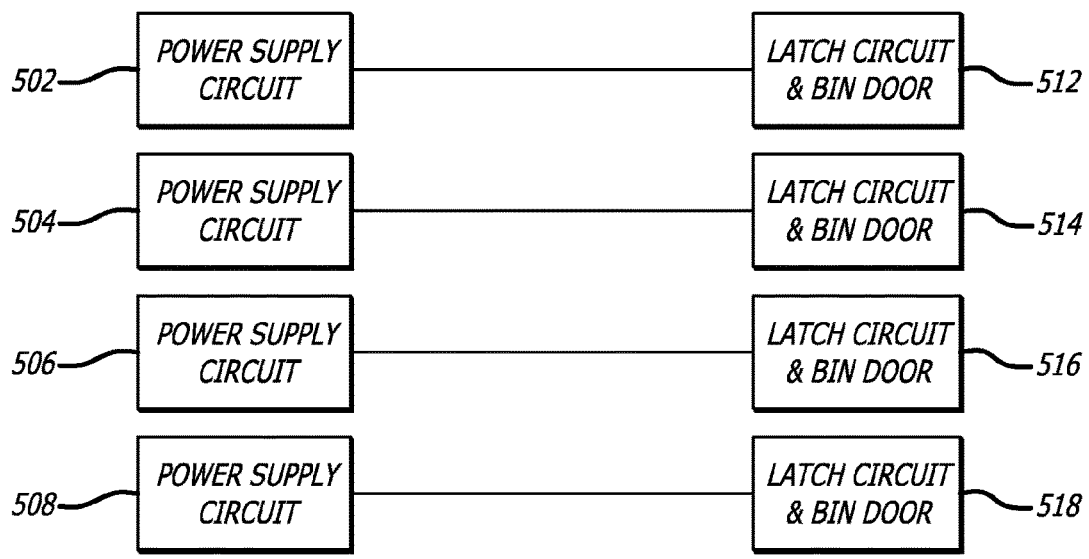
FIG. 8 is a block diagram of a plurality of power supply circuits, each coupled to a single corresponding latch circuit and a stowage bin door, according to an example of the present disclosure.

FIG. 8 is a block diagram of a plurality of power supply circuits, each coupled to a single corresponding latch circuit and stowage bin door, according to an example of the present disclosure. Thus, differently from the example illustrated in FIG. 7, implementing a separate power supply circuit 502-508 for each corresponding latch circuit and stowage bin door 512-518 may be achieved at a higher cost. However, increased reliability of the system may be achieved because a failure of one power supply circuit will only affect one stowage bin door, and other stowage bin doors may continue to be operated normally. Additionally, the power supply circuit 502-508 may be located in close proximity with the latch circuit within the vicinity of the stowage bin door, therefore reducing the amount of wiring that is routed throughout the aircraft, which further increase reliability. Thus, in some instances, it may be desirable to implement using a combination of the arrangements illustrated in FIGS. 7 and 8. For example, certain stowage bin doors that require higher reliability because they contain critical emergency equipment, may be implemented with each stowage bin door having its own power supply circuit and latch circuit, whereas the stowage bin doors that are not used to store emergency equipment may be implemented by grouping them together and powering them with a single power supply circuit. Thus, a balance of cost savings and reliability may be achieved. Separate power supply circuits 502-508 are similar to the power supply circuit 200 described with respect to FIG. 5 and thus are not described in as great of detail. It should be explicitly noted, however, that in examples, any possibilities and permutations described above with respect to the power supply circuit 200 may equally apply to separate power supply circuits 502-508. Further, each corresponding latch circuit and stowage bin door 512-518 is similar to the latch circuit and stowage bin door described with reference to FIG. 1-5 and thus is not described in as great of detail. It should be explicitly noted, however, that in examples, any possibilities and permutations described above with respect to the latch circuit and stowage bin door described with reference to FIGS. 1-5 may equally apply to each corresponding latch circuit and stowage bin door 512-518.

Figure 9:
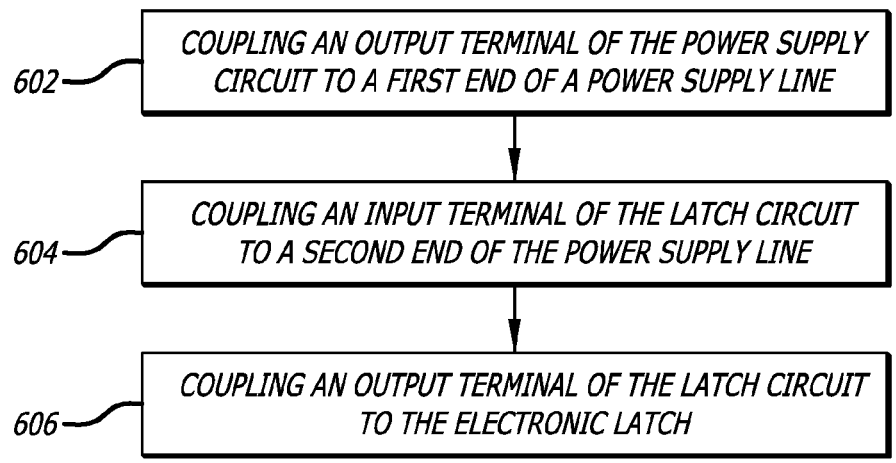
FIG. 9 is a flow chart of a method of assembling a power supply circuit and a latch circuit to an electronic latch, according to an example of the present disclosure.

FIG. 9 is a flow chart of a method of assembling a power supply circuit 200 and a latch circuit 202 to an electronic latch 106, according to an example of the present disclosure. Thus, according to one example, the power supply circuit 200 and the latch circuit 202 of the present disclosure may be implemented on an aircraft 101 by first coupling an output terminal of the power supply circuit 200 to a first end of a power supply line 218 (or wiring) that is routed throughout the aircraft 101 (602). Next, an input terminal of the latch circuit 202 may be coupled to a second end of the power supply line 218 (604). That is, the power supply line 218 is laid out in an aircraft 101 and routed from the location of the power supply circuit 200 to the location of the latch circuit 202 at the stowage bins 102. Finally, an output terminal of the latch circuit 202 may be coupled to the electronic latch 106 of the stowage bin 102 (606). Accordingly, the electronic latch system and its associated power system of the present disclosure may be implemented in an aircraft 101.

Figure 10:
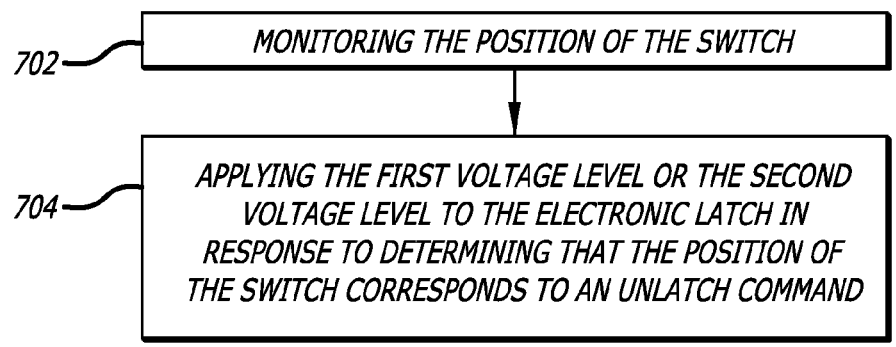
FIG. 10 is a flow chart of a method of operating a stowage bin door, according to an example of the present disclosure.

FIG. 10 is a flow chart of a method of operating a stowage bin door 108, according to an example of the present disclosure. According to one example, the position of a switch 222 that is operable by a user is monitored by the latch board circuit 202 (702). In some circuits, the switch 222 may have two positions. A first position may correspond to a position when no user input is received, which therefore corresponds to a latched or locked electronic latch condition. A second position may correspond to a position when a user input is received at the stowage bin door 108 button or lever, which therefore corresponds to an unlatched or unlocked electronic latch 106 condition. Thus, when a switch 222 position that corresponds to the second position (e.g., unlatch command) is determined by the latch circuit 202, the latch circuit 202 applies a first voltage level in normal operations or a second voltage level in power loss condition, to the electronic latch 106 (704). Accordingly, the stowage bin door 108 may be operated by the latch circuit 202 when an input is received by the user. According to another example, the input may be provided by a computer or an automated system that is programmed to depress the switch to send the unlatch command to the stowage bin door 108.

Figure 11:
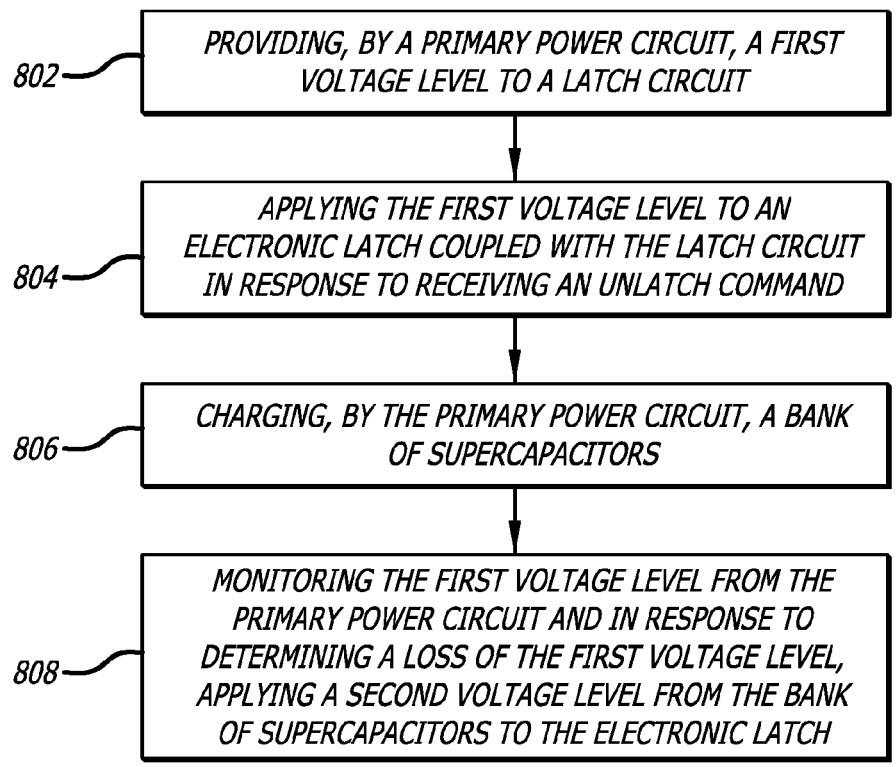
FIG. 11 is a flow chart of a method of operating an electronic latch, according to an example of the present disclosure.

FIG. 11 is a flow chart of a method of operating an electronic latch 106, according to an example of the present disclosure. Thus, according to one example, a first voltage level may be provided to the latch circuit 202 from the primary power circuit 206 (802). Next, the first voltage level may be applied to the electronic latch 106 in response to receiving an unlatch command (804). During normal operations, whenever power is provided from the primary power circuit 206, the bank of supercapacitors 213 is charged (806). Furthermore, the charge is continuously applied and maintained on the supercapacitors 213 as long the primary power circuit 206 continues to provide power. As the primary power circuit 206 provides the first voltage level to the latch circuit 202, the presence of the first voltage level is monitored, and in response the determining that the first voltage level is lost, a second voltage level from the bank of supercapacitors 213 is applied to the latch circuit. The latch circuit 202 then applies the second voltage level to the electronic latch 106, when the latch circuit 202 receives the unlatch command (808).

Accordingly, the electronic latch 106 may be operated by the latch circuit 202 using power provided from the primary power circuit 206 or the bank of supercapacitors 213 as backup or supplemental power, thus providing a reliable means for ensuring operability of the stowage bin doors 108. The supercapacitors 213 may be configured to provide extended ride-through power to be able to provide power to the latch circuit 202 for hours, days, or weeks, depending on the configuration of the bank of supercapacitors 213 and the number of supercapacitors in the bank of supercapacitors 213. Additionally, when there is no load on the supercapacitors (e.g., supercapacitors on idle), the supercapacitors may hold the charge for hours, days, weeks, or months, also depending on the configuration of the bank of supercapacitors 213 and the associated circuit. Consequently, the supercapacitors provide a reliable means for backup or supplemental power, particularly for use with critical systems.

Similarly, the techniques described herein the present disclosure may be implemented in other types of electronic systems and devices that require reliable power and portability such as in a vehicle. In certain examples, the vehicle may be an airplane, a helicopter, a boat, a car, a train (e.g., passenger train), or a motorcycle, that uses extended ride-through power system to provide a reliable backup or supplemental power to energize and operate electronic devices. According to another example, the vehicle may have an encryption key (e.g., for a secure communication system) that is loaded and stored in a computer system, and the supercapacitors as described in the present disclosure may be used to maintain the encryption key in memory even when the main power to the vehicle is turned off or lost. As such, a person having ordinary skill in the art can implement the supplemental power systems and methods described herein, in a variety of applications as contemplated by way of various examples above.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the examples.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The electronic or electric devices and/or any other relevant devices or components according to examples described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the provided examples.

Unless otherwise defined, all terms (including technical and scientific terms) used herein have the same meaning as commonly understood by one of ordinary skill in the art to which the examples belong. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A system comprising:
    a latch circuit configured to monitor a switch and to operate an electronic latch based on a position of the switch; and
    a power supply circuit configured to provide a voltage level to the latch circuit on a coupling coupled to an output terminal of the power supply circuit and coupled to the latch circuit, wherein the voltage level is:
        a predefined first voltage level during normal operations, and
        a predefined second voltage level different from the first voltage level during power loss,
    wherein the power supply circuit comprises:
        a primary power circuit configured to provide the first voltage level on the coupling; and
        a plurality of supercapacitors configured to be charged by the primary power circuit and provide the second voltage level on the coupling;
    wherein the latch circuit comprises a power failure detection circuit coupled to the coupling and configured to determine a presence or loss of power from the primary power circuit based on whether the voltage level on the coupling corresponds to the first voltage level or the second voltage level.

2. The system of claim 1, wherein the power supply circuit further comprises:
    a power conditioner coupled to an output of the supercapacitors to filter an output voltage of the supercapacitors; and
    a power converter coupled to an output of the power conditioner to convert an output voltage of the power conditioner to the second voltage level.

3. The system of claim 2, further comprising a logic circuit at an output of the primary power circuit and an output of the plurality of supercapacitors, and configured to monitor a presence of the first voltage level,
    wherein the first voltage level is provided to the latch circuit in response to determining that the first voltage level is present, and
    wherein the second voltage level is provided to the latch circuit in response to determining that the first voltage level is lost.

4. The system of claim 1,
    wherein the power supply circuit further comprises a charging circuit, wherein the plurality of supercapacitors is configured to be charged by the charging circuit from the primary power circuit during normal operations, and wherein the plurality of supercapacitors is configured to discharge and provide power to the latch circuit during the power loss.

5. The system of claim 1, wherein the plurality of supercapacitors is configured to provide ride-through power to the latch circuit during the power loss.

6. The system of claim 1, wherein the plurality of supercapacitors comprises a bank of supercapacitors, and wherein each supercapacitor of the plurality of supercapacitors is an electric double-layer capacitor (EDLC).

7. The system of claim 1, further comprising the electronic latch coupled with the latch circuit, wherein the electronic latch comprises a solenoid configured to unlatch or latch the electronic latch.

8. A vehicle including the system of claim 7, the vehicle further comprising:

a stowage bin; and a bin door comprising the electronic latch and coupled to the stowage bin, wherein the electronic latch is configured to open the bin door in response to the solenoid unlatching the electronic latch.

9. The vehicle of claim 8, further comprising a plurality of bin doors, each bin door comprising an electronic latch and corresponding latch circuit, wherein each electronic latch and latch circuit are powered by a separate corresponding power supply circuit.

10. The vehicle of claim 8, further comprising a plurality of bin doors, each bin door comprising an electronic latch and a corresponding latch circuit, wherein a plurality of electronic latches and corresponding latch circuits are powered by the same power supply circuit.

11. The vehicle of claim 8, wherein the vehicle is an aircraft.

12. A method of assembling the system of claim 1, the method comprising:

coupling the output terminal of the power supply circuit to a first end of a power supply line comprising the coupling;

coupling an input terminal of the latch circuit to a second end of the power supply line; and coupling an output terminal of the latch circuit to the electronic latch.

13. The method of claim 12, further comprising:

coupling the output terminal of the power supply circuit to first ends of a plurality of power supply lines, and coupling second ends of each of the plurality of power supply lines to a corresponding latch circuit of a plurality of latch circuits.

14. A method for operating a stowage bin door of a vehicle comprising the system of claim 1, the method comprising:

monitoring the position of the switch; and applying the first voltage level or the second voltage level to the electronic latch in response to determining that the position of the switch corresponds to an unlatch command.

15. The system of claim 1, further comprising an indicator configured to generate a human perceptible indication of a power loss upon determining a loss of power by the power failure detection circuit.

16. A method comprising:

providing, by a primary power circuit, a first voltage for use during normal operations;

providing, by a supercapacitor circuit comprising a bank of supercapacitors, a second voltage for use during power loss;

determining if the first voltage is a predefined first voltage level for use during normal operations;

upon determining that the first voltage is the first voltage level, providing the first voltage to an output terminal of a power supply circuit comprising the primary power circuit and the supercapacitor circuit, the output terminal being coupled to a latch circuit;

upon determining that the first voltage is not the first voltage level, providing the second voltage to the output terminal, the second voltage being a predefined second voltage level different from the first voltage level;

applying the voltage on the output terminal to an electronic latch coupled with the latch circuit in response to receiving an unlatch command;

charging, by the primary power circuit, a bank of supercapacitors; and monitoring the voltage on the output terminal to detect a loss of power from the primary power circuit based on the voltage on the output terminal being different than the first voltage level.

17. The method of claim 16, further comprising:

applying the voltage level on the output terminal to a solenoid coupled with the electronic latch; and energizing the solenoid by the voltage level from the output terminal to unlatch the electronic latch and deenergizing the solenoid to latch the electronic latch.

18. The method of claim 17, wherein the unlatch command is based on a position of a switch coupled with the latch circuit.

19. The method of claim 16, further comprising:

filtering, by a power conditioner, an output voltage of the bank of supercapacitors; and converting, by a power converter, an output voltage of the power conditioner to generate the second voltage level.

20. The method of claim 16, further comprising providing a human perceptible indication of a power loss upon detecting the loss of power.

* * * * *